US008522086B1

(12) United States Patent
Garrett

(10) Patent No.: US 8,522,086 B1
(45) Date of Patent: Aug. 27, 2013

(54) METHOD AND APPARATUS FOR PROVIDING RELOCATION NOTIFICATION

(75) Inventor: Steven Harold Garrett, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 763 days.

(21) Appl. No.: 11/121,213

(22) Filed: May 3, 2005

(51) Int. Cl.
*G06F 11/00* (2006.01)

(52) U.S. Cl.
USPC .......................................................... 714/48

(58) Field of Classification Search
USPC .......................................................... 714/48
See application file for complete search history.

(56) References Cited

U.S. PATENT DOCUMENTS

| 2002/0073364 A1* | 6/2002 | Katagiri et al. ................ 714/48 |
| 2003/0046339 A1* | 3/2003 | Ip .................................. 709/203 |
| 2004/0249904 A1* | 12/2004 | Moore et al. ................. 709/216 |
| 2006/0195561 A1* | 8/2006 | Keane et al. ................. 709/223 |

OTHER PUBLICATIONS

Joseph Davies, Thomas Lee, Domain Name Service (DNS), Chapter 16 from Microsoft Windows 2000 TCP/IP Protocols and Services Technical Reference, Jan. 2000, Microsoft Press, http://technet.microsoft.com/en-us/library/bb726935.aspx#EEAA.*
DNS Servers, Microsoft Windows 2000 TCP/IP Core Networking Guide, Jan. 2000, http://www.microsoft.com/technet/prodtechnol/windows2000serv/reskit/cnet/cncc_dns_ncku.mspx?mfr=true.*
MSDN Library, Microsoft Visual Studio 2003, CBlobCache, Jun. 2003, http://msdn2.microsoft.com/en-us/library/3yx9fkaz(VS.71).aspx.*
U.S. Appl. No. 11/120,354, filed May 3, 2005, Steven Harold Garrett.
U.S. Appl. No. 11/120,506, filed May 3, 2005, Steven Harold Garrett.
U.S. Appl. No. 11/120,505, filed May 3, 2005, Steven Harold Garrett.

* cited by examiner

*Primary Examiner* — Scott Baderman
*Assistant Examiner* — Jigar Patel
(74) *Attorney, Agent, or Firm* — Dergosits & Noah LLP; Todd A. Noah

(57) ABSTRACT

In one embodiment, a method and apparatus for notifying a client computer that a service accessed by the client computer is unavailable as a result of the service being relocated. In a further embodiment, a method and apparatus providing a notification to a client computer that a service has been relocated so that the service is no longer accessible via a network address stored in the local store of the client computer. In one embodiment, further flushing a local store of a client computer in response to a notification that a service has been relocated so that the service is no longer accessible via a network address stored in the local store of the client computer.

56 Claims, 6 Drawing Sheets

METHOD AND APPARATUS FOR PROVIDING RELOCATION NOTIFICATION

FIELD OF THE INVENTION

The present invention relates to computer systems including an availability monitor that seeks to maintain the availability of one or more services on the computer systems.

BACKGROUND

Computer systems often include a number of computers (e.g., servers and clients) interconnected via a network, allowing for communication between the servers and one or more users via the client computers. In some networked computer systems, availability monitors are utilized to ensure the availability of services (e.g., computer programs) residing on the servers. As a result, failure of a service hosted on a server being accessed by a user need not result in termination of the service. Instead, the service may be relocated to another server on the network, ensuring the service availability.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

DETAILED DESCRIPTION

As described above, networked computer systems may comprise availability monitors that ensure the availability of services. Availability monitors provide failover protection, whereby a service may be relocated from one server (e.g., a malfunctioning one) to another (e.g., functioning server). Furthermore, relocation of services across a network may also be initiated for reasons other than fault tolerance. Examples include to redistribute work load on a network, to allow for hardware or software changes, and to add a new device to a network.

Automated availability software monitors may implement a process involved in monitoring a network and taking actions to ensure availability. An example of such a software monitor is the Automated Availability Manager (AAM) offered by Legato, a Division of EMC Corporation of Hopkinton, Mass. Automated availability monitors provide management capabilities in an automated manner that relieve a system administrator from continuously monitoring network resources.

Figure 1:
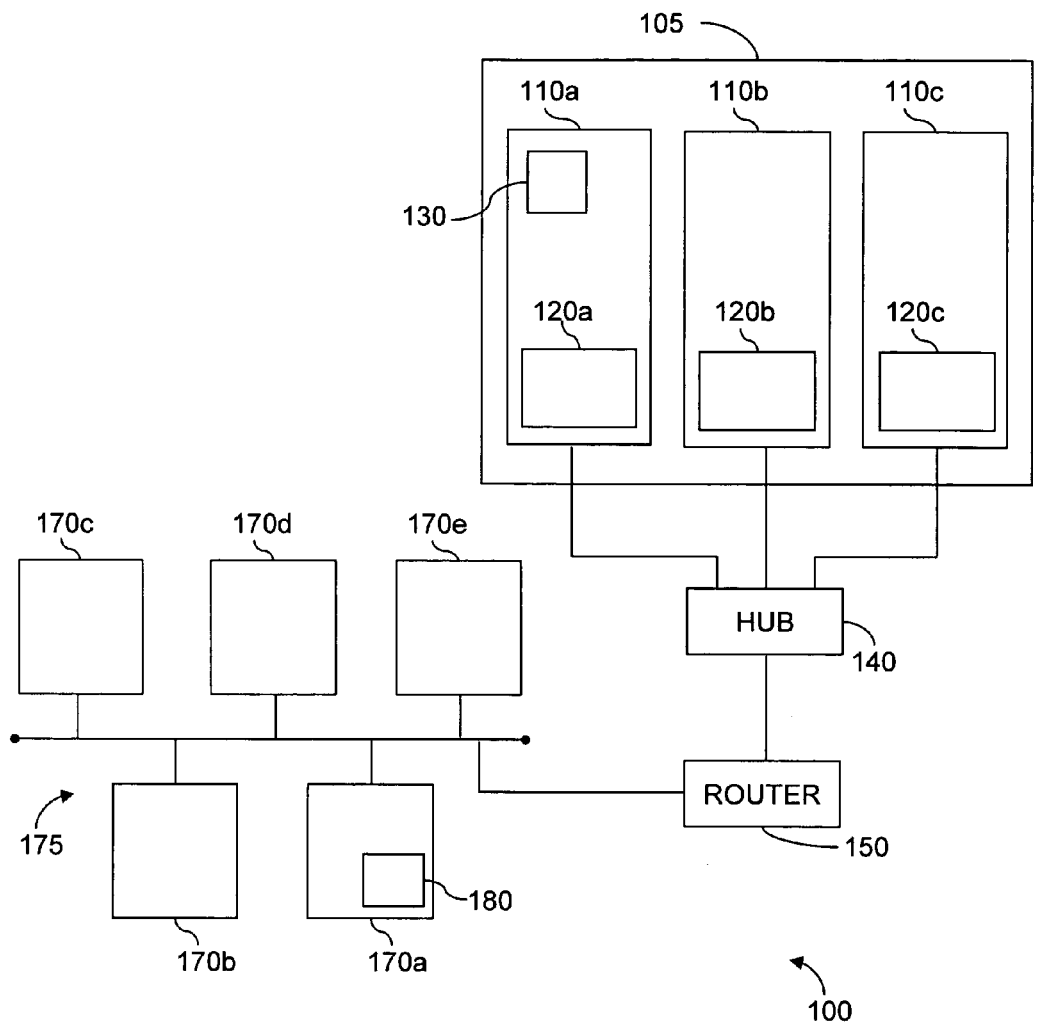
FIG. 1 is a block diagram of a prior art system on which an availability monitor is implemented.

FIG. 1 illustrates a conventional system 100 monitored by an availability monitor (120a-120c). System 100 includes a cluster 105 comprising a plurality of physical computer nodes (e.g., servers) 110a-110c interconnected via a network. The network may be of any type that allows servers 110a-110c to communicate among each other. In the configuration shown in FIG. 1, the network interconnecting 110a-110c comprises a hub 140 and a plurality of network connections between the hub 140 and the servers 110a-110c. The system 100 further comprises client computers 170a-170e that connect with the servers 110a-110c, and another network 175 that connects client computers 170a-170e to a router 150. The router 150 is connected to the hub 140, allowing for communication between client computers 170a-170e and servers 110a-110c. Network 175 may be any type of network providing the desired connectivity, including a LAN, a WAN, the Internet, other types of networks, or any combination thereof.

In the illustrative implementation in FIG. 1, servers 110a-110c in the cluster 105 may host services which may be accessed by clients 170a-170e. Examples of such services include a word processor application, web browser application, database software, and email service.

In the illustrative implementation in FIG. 1, a service 130 resides on the server 110a. In this example, an application 180 on the client computer 170a may access the service 130 on the server 110a. From the perspective of an end user utilizing the application 180 on client computer 170a, or even the perspective of the client computer 170a, the cluster 105 might be perceived as a single entity, so that the end user and/or the client computer 170a may have no knowledge as to which specific server the service 130 resides on. This transparency facilitates failover protection, wherein the service 130, originally residing on server 110a, may be relocated to any other functioning server (e.g., servers 110b-110c) in the event of a failure on server 110a. Such relocation may be managed by a system administrator, or may be automated and managed by an availability monitor.

In the illustrative example of FIG. 1, an availability monitor may be installed on the system (e.g., on cluster 105) to monitor and control the various services residing on the cluster 105. Numerous implementations are possible, including a distributed monitor that includes automated availability monitor agents 120a-120c installed on servers 110a-110c, with each agent monitoring and controlling the services hosted by the server on which the agent resides. The availability monitor agents 120a-120c may be installed on some or all of the servers 110a-110c and may be capable of performing numerous functions, including detecting system metrics and coordinating actions based on the sensed information by acting unilaterally, or by communicating with the other availability monitor agents in the cluster.

While the availability monitor illustrated in the embodiment of FIG. 1 comprises a distributed availability monitor with an agent on each server, it should be noted that the aspects of the present invention described herein are not limited to use with an availability monitor having this or any other particular configuration, and may be used with other configurations, including non-distributed implementations. Furthermore, it should be appreciated that systems on which an availability monitor may execute are not limited to the specific implementation of FIG. 2, and may, in general, be implemented in various system configurations using different network connection topologies.

In instances when the availability monitor detects a malfunction or reduced performance on the server 110a, the service 130 may be relocated to another server satisfying appropriate relocation criteria. The aspects of the present invention described herein are not limited to use within availability monitors that use any particular relocation techniques, and can be employed with monitors that employ any suitable relocation techniques.

In conventional systems, during the relocation process, the application 180 on the client computer 170a is not able to access the service 130, which may cause the application 180 to hang or to respond to the user. Since the relocation process may sometimes require a significant amount of time (e.g., minutes to hours may be required to complete the relocation of some services, including those that include databases) the end user utilizing the application 180 on the client computer 170a may experience a prolonged delay in resuming access to the service 130.

Applicant has appreciated this deficiency in conventional systems and has realized that it may be beneficial to provide notification to the user, when a service (e.g., the service 130) is unavailable due to a relocation. Thus, one embodiment notifies a user on a client computer that a service is unavailable because of relocation. In one embodiment, the notification provides an estimate of the time when the services will again be available but the present invention is not limited in this respect.

Figure 2:
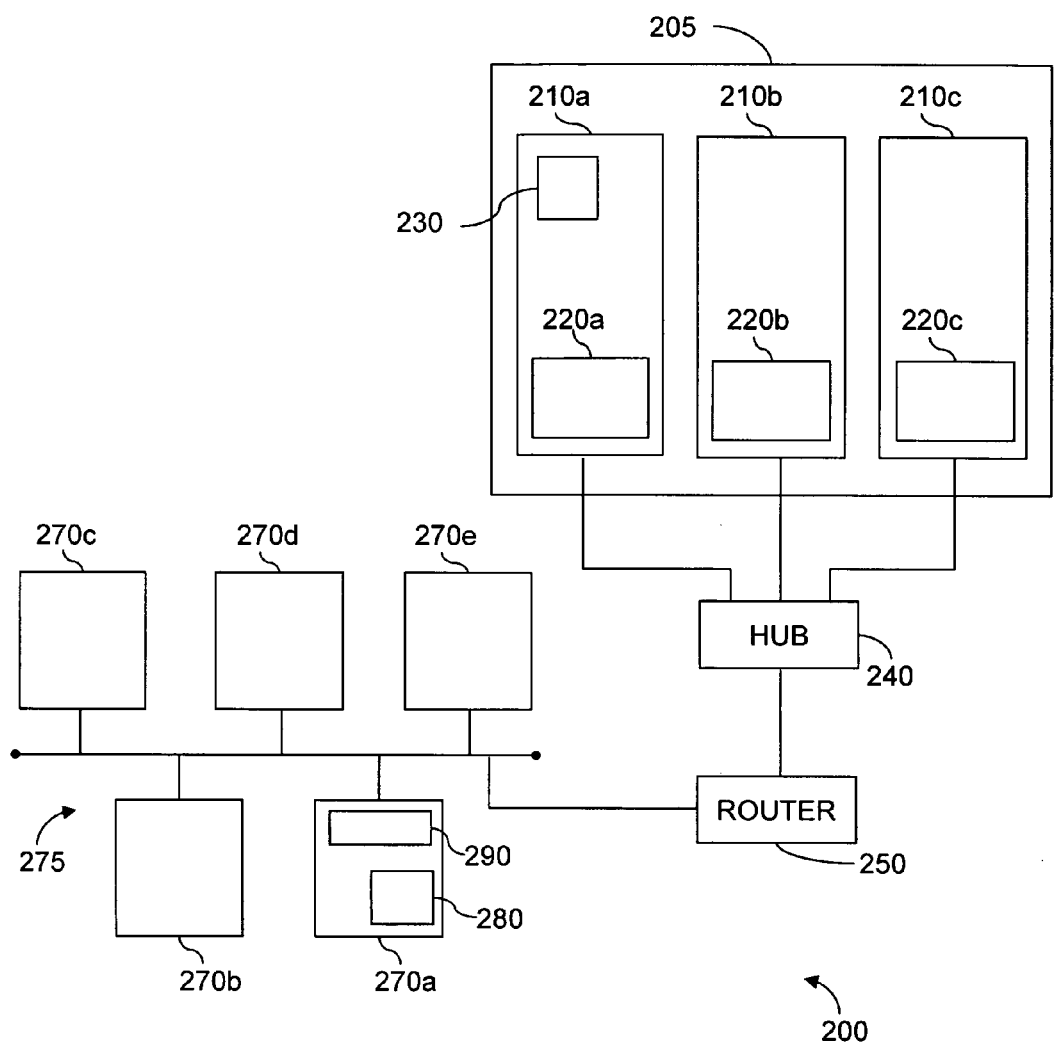
FIG. 2 is a block diagram showing an exemplary system on which a cluster event service resides on a client computer in accordance with one embodiment of the invention.

FIG. 2 illustrates an exemplary system on which one embodiment of the invention relating to a cluster event service is implemented that provides notification to a user when a service is unavailable because it is being relocated. The system 200 includes a cluster 205 including servers 210a-210c and availability monitor agents 220a-220c. In this example, server 210a hosts a service 230. While a single service 230 is shown, it should be appreciated that a server may host multiple services. The system 200 also comprises client computers 270a-270e, which may be connected to the cluster 205 via router 250 and hub 240. It should be appreciated that the embodiment of the invention directed to a cluster event service that provides notification when a service is unavailable due to relocation is not be limited to the particular network configuration shown or to any other specific network configuration, as it can be employed with any other type of network configuration, including ones with different numbers of servers, different types of availability monitors and different types of network topologies.

In the configuration shown, an application 280 resides on the client 270a and may access the service 230 residing on the server 210a. The availability monitor agent 220a may control the relocation of the service 230 from server 210a to any other server 210b-210c in cluster 205 for any desired reason. For example, this relocation may have been initiated due to a failover event, in response to hardware or software changes, or as a result of a planned relocation. In one embodiment, as a result of the relocation, a notification may be transmitted (e.g., broadcast) from the availability monitor, for example, availability monitor agent 220a, notifying one or more of client computers 270a-270e that the service 230 is unavailable due to relocation. The notification can be transmitted upon commencement of the relocation, during the relocation, in response to a client seeking to access the service, or at any suitable time.

In one embodiment, the client computer 270a includes a cluster event service 290 that receives the notification issued from the availability monitor on the cluster 205, and may notify the user of the client computer 270a that the service 230 is unavailable due to relocation. While the cluster event service 290 is illustrated as being disposed only on the client 270a, it should be appreciated that it may be located on one or more clients 270a-270e. In addition, the cluster event service can alternatively be implemented on one or more other computers on the same local network as the client and need not be resident on each client, as the aspect of the invention that relates to a cluster event service is not limited to any particular implementation.

In one embodiment, the notification sent by the availability monitor may include information relating to an estimated time required to complete the relocation process of service 230. In such an embodiment, the cluster event service 290 may relay the time information to the end user employing client computer 270a. The information can take any suitable form, including an estimated completion time and/or a percentage of the relocation that is complete, as this aspect of the invention is not limited to any particular type of information. While providing information indicative of the progress of the relocation may be desirable, the invention is not limited in this respect as some embodiments provide no such information.

In some embodiments, the availability monitor of cluster 205 may transmit (e.g., broadcast) multiple notifications at different times (e.g., at regular time intervals or at intermittent time intervals), and each notification may provide information relating to progress of the relocation of service 130. In some embodiments, the cluster event service 290 receives the transmitted notifications and may update information that is provided to the end user of client computer 270a, but the notification process is not limited to this or any specific process.

Figure 3:
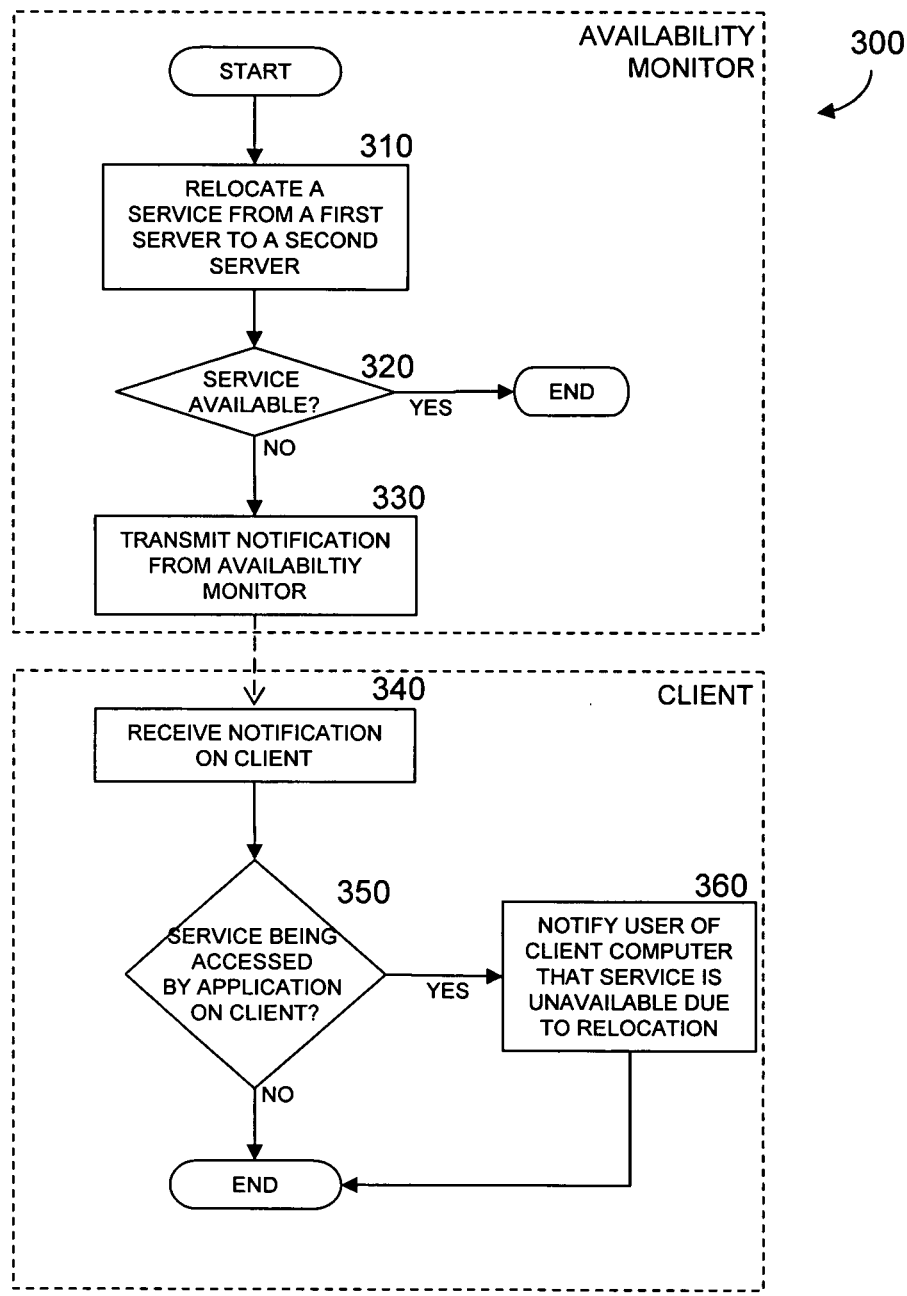
FIG. 3 is a flow chart showing an exemplary process for notifying a client computer that a service is unavailable because of relocation in accordance with one embodiment of the invention.

FIG. 3 is a flow chart illustrating one embodiment of a notification process 300. In act 310, the service 230 is relocated from a first server 210a to a second server (e.g., 210b or 210c). The relocation process may be controlled by the availability monitor (e.g., by one or more of the availability monitor agents 220a-220c) and may have been initiated due to a failover on server 210a or any other relocation event trigger. In act 320, the availability monitor may determine whether the service 230 is unavailable to clients due to the relocation process. In cases where the relocation proceeds quickly so as not to interfere with the use of the service by the client computer 270a, the service may be deemed available and the process simply ends. In contrast, when the relocation process requires an amount of time (e.g., minutes, hours or any other desired timeframe) deemed to be significant, the availability monitor transmits (e.g., broadcasts) a notification to one or more client computers accessing a subnet on which the cluster 205 is present, as shown in act 330. The notification optionally may comprise information about the progress of relocation of the service 230 as discussed above, and/or any other pertinent information regarding the relocation of service 230.

In act 340, the cluster event service 290 on client computer 270a receives the notification transmitted by the availability monitor on cluster 205. In acts 350 and 360, when the service 230 is being accessed by the application 290 on the client computer 270a, the end user of the client computer 270 is notified that the service 230 is unavailable due to relocation.

It should be appreciated that a single cluster event service 290 may receive information regarding the relocation of any number of services on cluster 205, and is not limited to use with a single service. In other embodiments, multiple cluster event services may reside on any given client computer, and each cluster event service may receive notifications of the relocation of one or more services residing on the cluster 205.

Figure 4:
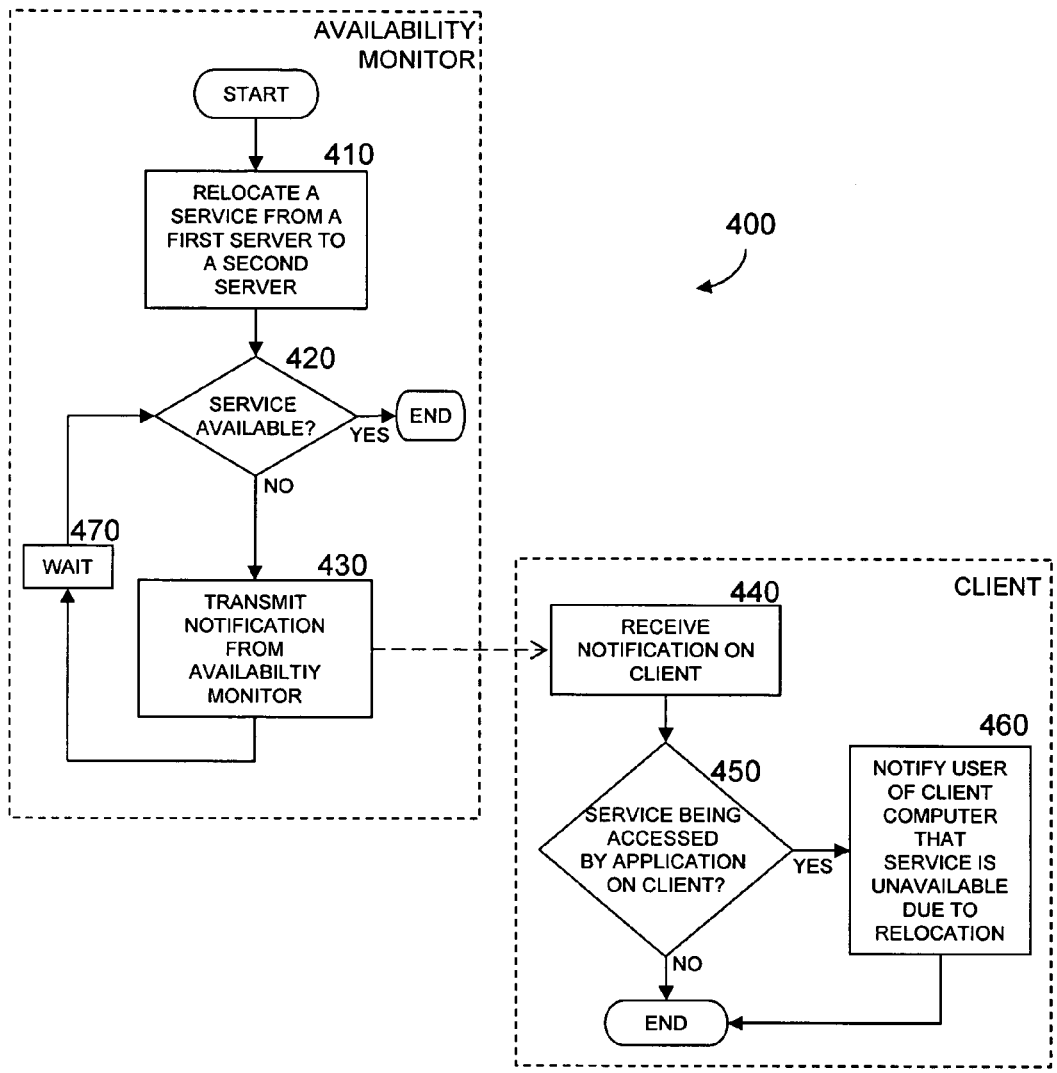
FIG. 4 is a flow chart showing an exemplary process for notifying a client computer multiple times that a service is unavailable because of relocation in accordance with one embodiment of the invention.

FIG. 4 illustrates a process flow for a process 400 for notifying one or more client computers multiple times that a service is unavailable because of relocation. In act 410, a service 230 is relocated from a first server (e.g., 210a) to a second server (e.g., 210b or 210c). In act 420, the availability monitor (e.g., one or more of the availability monitor agents 220a-220c) determines whether the service 230 is available to the client computers 270a-270e. For example, when the service relocation process is completed within an amount of time such that the client computers may not become aware of, or significantly inconvenienced by, the unavailability of the service 230, the service 230 may be deemed available and the process ends. In contrast, when the amount of time required to complete the relocation of service 230 is determined to be significant, the availability monitor on cluster 205 transmits (e.g., broadcasts) a notification that the service 230 is being relocated, as shown in act 430. The notification optionally may contain information as to the progress of the relocation process of service 230, as discussed above, and/or any other pertinent information relating to the relocation of service 230.

In act 440, the cluster event service 290 residing on client computer 270a, receives the notification transmitted by the availability monitor on cluster 205. The cluster event service 290 then determines whether the service 230 is being accessed by the application 280 on client computer 270a, as shown in act 450. When the application 280 is accessing the service 230, a notification is issued to the user of client computer 270a that the service 230 is unavailable because of relocation, as noted in act 460.

In act 470, the availability monitor of cluster 205 waits a period of time, which may be predetermined or otherwise determined by the administrator on the basis of input criteria, or in any other suitable way, and returns to act 420 to once again determine whether the service is now available. When the service is still unavailable due to the relocation process, the remainder of the process is performed, as noted in acts 430, 440, 450, and 460. In such a case, the newly transmitted notification optionally may contain updated information on the progress of the relocation process.

Another embodiment of the invention is directed to a technique wherein a notification is provided to a client computer that a service has been relocated, such that the service is no longer accessible via a network address previously used by the client computer to access the service. In this respect, in a conventional computer system comprising a cluster of servers, services residing on the servers, and clients accessing services on the servers, a record of the network address (e.g., an Internet Protocol (IP) address) in the cluster is kept in a Domain Name System (DNS) service. The DNS service may reside on one or more servers on the cluster and may contain a set of records correlating IP addresses in the cluster with hostnames. Conventional systems may also possess an active directory service, which provides the hostname that each given service resides on. In such systems, a client requesting access to a service can be provided, by the active directory, with the hostname of a host that hosts the service, and the DNS service can provide the IP address for the appropriate hostname (i.e., the IP address at which a service resides).

The IP address assigned to a hostname may be a virtual IP address or fixed IP address. Fixed IP addresses may be assigned to each physical node in the cluster and may comprise a subnet prefix, which is the same for all physical nodes in the cluster, and a suffix, which depends on the specific physical node. In contrast, virtual IP addresses are movable IP addresses managed by an availability monitor so that they may be moved (or mapped) to any physical node in the cluster, such that each virtual IP address may be mapped to a corresponding fixed IP address. Virtual IP addresses also possess a prefix designating the subnet and a suffix differentiating the IP address from other IP addresses on the same subnet.

Some conventional systems also possess DNS caches on client computers that contain a subset of the records in the DNS service and are used to increase performance when accessing a service by avoiding the need to query the active directory and DNS service to obtain the IP address at which the service is accessible. When a client computer attempts to access a service on a given hostname, the client computer looks up the IP address of the given hostname in its DNS cache and utilizes the stored IP address to access the service on the cluster.

Applicants have appreciated that when a service is relocated within a subnet, the movable IP address at which a service resides need not change due to the relocation process. In such cases, the client can continue to refer to the virtual IP address at which the service is located, irrespective of the physical server on which the service resides, and the availability monitor may map access requests to the virtual IP address to the fixed IP address of the physical server on which the service resides. As such, the IP address contained in the DNS cache for the relocated service remains valid.

In contrast, when a service is relocated from a first cluster on a first subnet to a second cluster on a second subnet, the virtual IP address used by the client(s) to reference the service is no longer valid, since the subnet prefix of the IP address would cause transmissions sent to the virtual IP address to be routed to the first subnet, so that they would not reach the second subnet. In conventional system, DNS services residing on the clusters are updated when a service is relocated outside the subnet, thereby ensuring that the IP address for the service is current and up-to-date. However, Applicant has appreciated that in conventional systems, the DNS cache on the client computers is not updated in response to a service being relocated outside a subnet. As a result, the client computers may attempt to access a relocated service using the previous IP address at which it previously was available. Only upon the expiration of a timeout period (which may be as long as half an hour to an hour), before which the client continually seeks to access the service at the now invalid IP addresses, is the DNS cache on the client flushed of its entry for the service and a discovery process is initiated so that the current IP address stored in the DNS service may be determined.

In accordance with one embodiment, when a service is relocated from a first cluster on a first subnet to a second cluster on a second subnet, the DNS cache of the client computer may be flushed or updated immediately upon the relocation, thereby avoiding the necessity for the client computer to futilely seek to access the service at its old IP address until the expiration of the timeout period.

Figure 5:
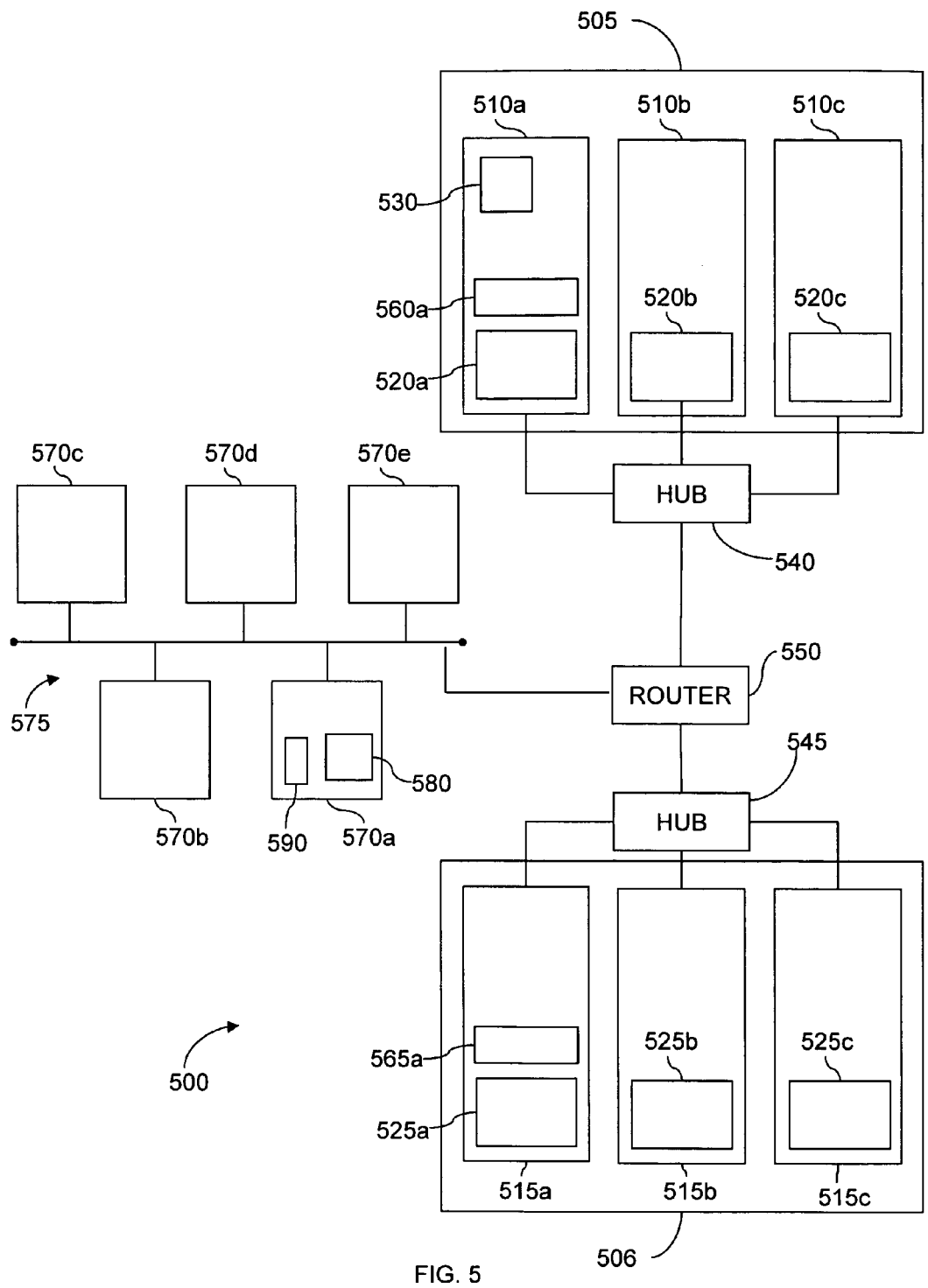
FIG. 5 is a block diagram showing an exemplary system on which at least one aspect of the invention may be implemented, the system comprising a DNS cache on a client computer, a first cluster possessing a first DNS, and a second cluster possessing a second DNS.

One embodiment of the invention that relates to notifying a client that the address in its DNS cache, for at least on service, is no longer valid will now be described referring to an illustrative system as in FIG. 5. The system 500 is illustrative, and the aspect of invention relating to notifying a client that an entry in a DNS cache for a service is not valid can be employed on numerous other systems with different configurations. System 500 comprises a first cluster 505 comprising servers 510a-510c and availability monitor agents 520a-520c residing on respective servers 510a-510c. A first DNS service 560a resides on the cluster 505, and contains the IP addresses corresponding to associated hostnames as described above. The IP addresses in the DNS service may comprise both fixed W addresses for the physical servers 510a-510c and virtual IP addresses that may be managed by the availability monitor (e.g., availability monitor agents 520a-520c). The system 500 also comprises a hub 540 allowing for the interconnection of the servers 510a-510c.

In addition, system 500 also comprises a second cluster 506 comprising servers 515a-515c and availability monitors 525a-525c. Cluster 506 also possesses a second DNS service 565a. Servers 515a-515c are interconnected via a hub 545, and hubs 545 and 540 are connected to a router 550. Router 550 also is connected to a client computer network 575, comprising client computers 570a-570e. Client computer 570a comprises a DNS cache 590 and application 580 accessing service 530.

Figure 6:
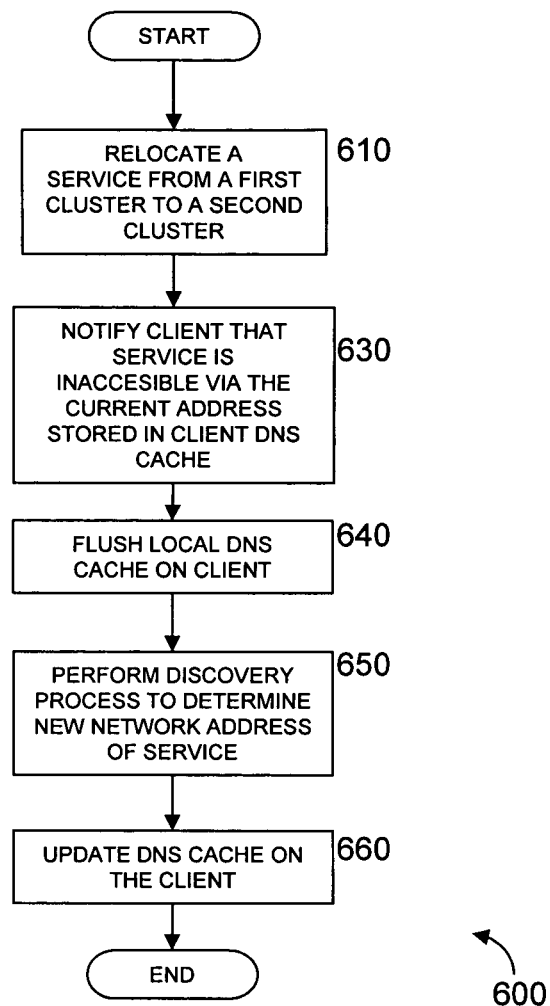
FIG. 6 is a flow chart showing an exemplary process for notifying a client computer that a service is inaccessible via the current address stored in its local DNS cache and flushing the local DNS cache in accordance with one embodiment of the invention.

FIG. 6 illustrates a process flow of a process for notifying a client of an invalid entry in its DNS cache resulting from relocation of a service. The process 600 begins with act 610 wherein a service (e.g., service 530) is relocated from a server on the first cluster (e.g., cluster 505) to a server on a second cluster (e.g., cluster 506). Since the service is relocated from a first subnet to a second, the first DNS service 560a and the second DNS service 565a are updated as a result of the relocation and contain the new IP address identifying the new location of the service after the relocation.

The process proceeds to act 630, wherein the client computer is notified that the service is inaccessible as a result of its relocation to a different cluster. This notification process may be performed by the availability monitor 520 on the first cluster 505, via the availability monitor 525 on the second cluster 506, via a combination of both, or via some other entity, as the present invention is not limited in this respect.

The notification (e.g., via a broadcast) may be received by a cluster event service 590 residing on the client computer 570a, as described in previous embodiments, but the aspect of the present invention directed to flushing or updating the DNS cache in response to a relocation is not limited in this respect, as it can be implemented in any suitable manner, including in systems that do not employ a client event service that notifies a user when a service is unavailable due to a relocation as described above.

In act 640, upon receiving the notification, the DNS cache 590 on the client computer 570a is flushed of the record associated with service that has been relocated, or flushed of all its records. In act 650, a discovery process is performed to determine the new address of the service 530. The discovery process may be automatically initiated in response to the flush, or in response to an attempt to access a record in the DNS cache 590 that results in a miss. The discovery process can be performed in any suitable manner, as the invention is not limited in this respect, and may involve issuing a query to cluster 505 and/or cluster 506. The query may be responded to by the DNS service 560a and/or the DNS service 565a, and the current records stored in the DNS services may be returned to the client computer 570a. In act 660, the DNS cache 590 on client computer 570a is updated with the current IP addresses discovered during the discovery phase 650.

As should be appreciated from the foregoing, there are numerous aspects of the present invention described herein that can be used independently of one another, including the aspects that relate to cluster event services to notify a user that a service is unavailable due to relocation and DNS cache flushing in response to service relocation. However, it should also be appreciated that in some embodiments, all of the above-described features can be used together, or any combination or subset of the features described above can be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed is:

1. A method of operating a computer system comprising a plurality of computer nodes, at least one service executing on at least one of the computer nodes in a first subnet, an availability monitor that maintains the availability of the service on at least one of the computer nodes and may relocate the service from one of the computer nodes in the first subnet to another computer node in a second subnet, at least one client computer executing at least one application program adapted to access the service, and a domain name service (DNS) that provides at least one network address at which the service is accessible to the client computer, the client computer comprising a local store that has at least one entry storing, from the DNS, the network address at which the service is accessible, the method comprising:

in response to the service being relocated by the monitor from a node in the first subnet to a node in the second subnet so that the service is no longer accessible at the network address stored in the local store for the client computer, providing, through an event services agent, a notification to the client computer before DNS updates the network address in the local store, the notification indicating that the service is no longer accessible via the network address stored in the local store for the client computer.

2. The method of claim 1, wherein the step of providing a notification is performed by the monitor.

3. The method of claim 1, further comprising flushing the entry from the local store.

4. The method of claim 3, wherein the flushing step is performed by the event services agent.

5. The method of claim 3, further comprising:
performing a discovery process after the flushing step to determine at least one new network address at which the service is accessible to the client computer following the relocation.

6. The method of claim 5, further comprising:
updating the local store with the new network address.

7. The method of claim 1, wherein the step of providing notification comprises notifying the event services agent that the service is unavailable at the network address stored in the local store for the client computer.

8. The method of claim 7, wherein the client computer comprises a plurality of client computers, each of the plurality of client computers comprising an event services agent executing thereon, and wherein the step of providing notification comprises issuing a broadcast from the availability monitor to each of the plurality of client computers when the service becomes unavailable at the network address stored in the local store for the client computer.

9. The method of claim 1, wherein the client computer comprises a facility that will perform a discovery process to attempt to determine a new network address at which the service is accessible to the client computer after expiration of a timeout period during which the service is found to be inaccessible at the network address stored in the local store, and wherein the step of providing notification comprises providing the notification prior to expiration of the timeout period.

10. The method of claim 1, further comprising updating the notification to provide an estimate of time to complete the relocation of the network device.

11. The method of claim 1, further comprising updating the notification to provide a percentage of completion for the relocation of the network device.

12. At least one non-transitory computer readable medium encoded with a plurality of instructions that, when executed, perform a method of operating a computer system, the computer system comprising a plurality of computer nodes, at least one service executing on at least one of the computer nodes in a first subnet, an availability monitor that maintains the availability of the service on at least one of the computer nodes and may relocate the service from one of the computer nodes to another computer node in a second subnet, at least one client computer executing at least one application program adapted to access the service, and a domain name service (DNS) that provides at least one network address at which the service is accessible to the client computer, the client computer comprising a local store that has at least one entry storing, from the DNS, the network address at which the service is accessible, the method comprising:

in response to the service being relocated by the monitor from a node in the first subnet to a node in the second subnet so that the service is no longer accessible at the network address stored in the local store for the client computer, providing, through an event services agent a notification to the client computer before DNS updates the network address in the local store, the notification indicating that the service is no longer accessible via the network address stored in the local store for the client computer.

13. The non-transitory computer readable medium of claim 12, wherein the notification step is provided by the monitor.

14. The non-transitory computer readable medium of claim 12, wherein the method further comprises
flushing the entry from the local store.

15. The non-transitory computer readable medium of claim 14, wherein the flushing step is performed by the event services agent.

16. The non-transitory computer readable medium of claim 14, wherein the method further comprises:
performing a discovery process after the flushing step to determine at least one new network address at which the service is accessible to the client computer following the relocation.

17. The non-transitory computer readable medium of claim 16, wherein the method further comprises
updating the local store with the new network address.

18. The non-transitory computer readable medium of claim 12, wherein the client computer comprises an event services agent executing thereon, and wherein the notification step comprises providing to the event services agent, the notification that the service is unavailable at the network address stored in the local store for the client computer.

19. The non-transitory computer readable medium of claim 18, wherein the client computer comprises a plurality of client computers, each of the plurality of client computers comprising an event services agent executing thereon, and wherein the notification step comprises providing a broadcast from the availability monitor to each of the plurality of client computers when the service is unavailable at the network address stored in the local store for the client computer.

20. The non-transitory computer readable medium of claim 14, wherein the client computer comprises a facility that will perform a discovery process to attempt to determine a new network address at which the service is accessible to the client computer after expiration of a timeout period during which the service is found to be inaccessible at the network address stored in the local store, and wherein the flushing step comprises flushing the entry from the local store prior to expiration of the timeout period.

21. At least one computer for use in a computer system comprising a plurality of computer nodes, at least one service executing on at least one of the plurality of computer nodes in a first subnet, an availability monitor that maintains the availability of the service on at least one of the plurality of computer nodes and may relocate the service from one of the computer nodes to another computer node in a second subnet, at least one client computer executing at least one application program adapted to access the service, and a domain name service (DNS) that provides at least one network address at which the service is accessible to the client computer, the client computer comprising a local store that has at least one entry storing, from the DNS, the network address at which the service is accessible, the computer comprising:
    at least one processor programmed to, in response to the at least one service being relocated by the monitor from a node in the first subnet to a node in the second subnet so that the service is no longer accessible at the network address stored in the local store for the client computer, provide, through an event services agent, a notification to the client computer before DNS updates the network address in the local store, the notification indicating that the service is no longer accessible via the network address stored in the local store for the client computer.

22. The computer of claim 21, wherein the processor is further programmed to implement the monitor, so that the notification is provided by the monitor.

23. The computer of claim 21, wherein the processor is further programmed to flush the entry from the local store.

24. The computer of claim 23, wherein the processor is further programmed to implement the event services agent, so that the flush of the entry from the local store is performed by the event services agent.

25. The computer of claim 23, wherein the processor is further programmed to, after flushing the entry from the local store:
    perform a discovery process to determine at least one new network address at which the service is accessible to the client computer following the relocation.

26. The computer of claim 25, wherein the processor is further programmed to:
    update the local store with the new network address.

27. The computer of claim 21, wherein the processor is programmed to provide the notification by notifying the event services agent that the service is unavailable at the network address stored in the local store for the client computer.

28. The computer of claim 27, wherein the client computer comprises a plurality of client computers, each of the plurality of client computers comprising an event services agent executing thereon, and wherein the processor is programmed to provide the notification by issuing a broadcast from the availability monitor to each of the plurality of client computers when the service becomes unavailable at the network address stored in the local store for the client computer.

29. The computer of claim 21, wherein the client computer comprises a facility that will perform a discovery process to attempt to determine a new network address at which the service is accessible to the client computer after expiration of a timeout period during which the service is found to be inaccessible at the network address stored in the local store, and wherein the processor is programmed to provide the notification by providing the notification prior to expiration of the timeout period.

30. A method of operating a computer system comprising a plurality of computer nodes, at least one service executing on at least one of the plurality of computer nodes in a first subnet, an availability monitor that maintains the availability of the service on at least one of the plurality of computer nodes and may relocate the service from one of the computer nodes to another computer node in a second subnet, at least one client computer executing at least one application program adapted to access the service, and a domain name service (DNS) that provides at least one network address at which the service is accessible to the client computer, the client computer comprising a local store that has at least one entry storing, from the DNS, the at least one network address at which the service is accessible, the method comprising:
    when the service is no longer accessible at the network address stored in the local store for the client computer as a result of being relocated by the monitor from a node in the first subnet to a node in the second subnet, receiving a notification at the client computer before DNS updates the network address in the local store, the notification indicating that the service has been relocated so that the service is no longer accessible via the network address stored in the local store for the client computer.

31. The method of claim 30, wherein the notification is received from the monitor.

32. The method of claim 30, further comprising, in response to receipt of the notification:
    flushing the entry from the local store.

33. The method of claim 32, wherein the client computer comprises an event services agent executing thereon that receives the notification, and wherein the flushing step is performed by the event services agent.

34. The method of claim 32, further comprising:
    performing a discovery process after the flushing step to determine at least one new network address at which the at least one service is accessible to the at least one client computer following the relocation.

35. The method of claim 34, further comprising:
    updating the local store with the new network address.

36. The method of claim 30, wherein the client computer comprises an event services agent executing thereon, and wherein the notification step comprises receiving, at the event services agent, the notification that the service is unavailable at the ene network address stored in the local store for the client computer.

37. The method of claim 36, wherein the client computer comprises a plurality of client computers, each of the plurality of client computers comprising an event services agent executing thereon, and wherein the notification step comprises receiving a broadcast from the availability monitor to each of the plurality of client computers when the service is unavailable at the network address stored in the local store for the client computer.

38. The method of claim 32, wherein the client computer comprises a facility that will perform a discovery process to attempt to determine a new network address at which the service is accessible to the client computer after expiration of a timeout period during which the service is found to be inaccessible at the network address stored in the local store, and wherein the flushing step comprises flushing the entry from the local store prior to expiration of the timeout period.

39. At least one non-transitory computer readable medium encoded with a plurality of instructions that, when executed, perform a method of operating a computer system, the computer system comprising a plurality of computer nodes, at least one service executing on at least one of the plurality of computer nodes, an availability monitor that maintains the availability of the service on at least one of the plurality of computer nodes and may relocate the at least one service from one of the plurality of computer nodes on a first subnet to another computer node on a second subnet, at least one client computer executing at least one application program adapted to access the service, and a domain name service (DNS) that provides at least one network address at which the service is accessible to the client computer, the client computer comprising a local store that has at least one entry storing, from the DNS, the network address at which the service is accessible, the method comprising:

when the service is no longer accessible at the network address stored in the local store for the client computer as a result of being relocated by the monitor from a node in the first subnet to a node in the second subnet, receiving a notification at the client computer before DNS updates the network address in the local store, the notification indicating that the service has been relocated so that the service is no longer accessible via the network address stored in the local store for the client computer.

40. The non-transitory computer readable medium of claim 39, wherein the notification is received from the monitor.

41. The non-transitory computer readable medium of claim 39, wherein the method further comprises, in response to receipt of the notification:

flushing the entry from the local store.

42. The non-transitory computer readable medium of claim 41, wherein the client computer comprises an event services agent executing thereon that receives the notification, and wherein the flushing step is performed by the event services agent.

43. The non-transitory computer readable medium of claim 41, wherein the method further comprises:

performing a discovery process after the flushing step to determine at least one new network address at which the service is accessible to the client computer following the relocation.

44. The non-transitory computer readable medium of claim 43, wherein the method further comprises:

updating the local store with the new network address.

45. The non-transitory computer readable medium of claim 39, wherein the client computer comprises an event services agent executing thereon, and wherein the notification step comprises receiving, at the event services agent, the notification that the service is unavailable at the network address stored in the local store for the client computer.

46. The non-transitory computer readable medium of claim 45, wherein the client computer comprises a plurality of client computers, each of the plurality of client computers comprising an event services agent executing thereon, and wherein the notification step comprises receiving a broadcast from the availability monitor to each of the plurality of client computers when the service is unavailable at the network address stored in the local store for the client computer.

47. The non-transitory computer readable medium of claim 41, wherein the client computer comprises a facility that will perform a discovery process to attempt to determine a new network address at which the service is accessible to the client computer after expiration of a timeout period during which the service is found to be inaccessible at the network address stored in the local store, and wherein the flushing step comprises flushing the entry from the local store prior to expiration of the timeout period.

48. At least one computer for use in a computer system comprising a plurality of computer nodes, at least one service executing on at least one of the plurality of computer nodes, an availability monitor that maintains the availability of the service on at least one of the plurality of computer nodes and may relocate the at least one service from one of the plurality of computer nodes in a first subnet to another computer node in a second subnet, at least one client computer executing at least one application program adapted to access the service, and a domain name service (DNS) that provides at least one network address at which the service is accessible to the client computer, the client computer comprising a local store that has at least one entry storing, from the DNS, the network address at which the service is accessible, the computer comprising:

at least one processor programmed to, when the service is no longer accessible at the network address stored in the local store for the client computer as a result of being relocated by the monitor from a first node in the first subnet to a second node in the second subnet, receive a notification at the client computer before DNS updates the network address in the local store, the notification indicating that the service has been relocated so that the service is no longer accessible via the network address stored in the local store for the client computer.

49. The computer of claim 48, wherein the processor is further programmed to implement the monitor so that the notification is received from the monitor.

50. The computer of claim 48, wherein the processor is further programmed to, in response to receipt of the notification, flush the at least one entry from the local store.

51. The computer of claim 50, wherein the processor is further programmed to implement an event services agent on the client computer that receives the notification and performs the flush of the entry from the local store.

52. The computer of claim 50, wherein the processor is further programmed to, after the flush of the entry from the local store, perform a discovery process to determine at least one new network address at which the service is accessible to the client computer following the relocation.

53. The computer of claim 52, wherein the processor is further programmed to update the local store with the new network address.

54. The computer of claim 48, wherein the client computer comprises an event services agent executing thereon, and wherein the processor is programmed to receive the notification by receiving, at the event services agent, the notification that the service is unavailable at the network address stored in the local store for the client computer.

55. The computer of claim 54, wherein the client computer comprises a plurality of client computers, each of the plurality of client computers comprising an event services agent executing thereon, and wherein the processor is programmed to receive the notification by receiving a broadcast from the availability monitor to each of the plurality of client computers when the service is unavailable at the network address stored in the local store for the client computer.

56. The computer of claim 50, wherein the client computer comprises a facility that will perform a discovery process to attempt to determine a new network address at which the service is accessible to the client computer after expiration of a timeout period during which the service is found to be inaccessible at the network address stored in the local store, and wherein the processor is programmed to flush the entry from the local store prior to expiration of the timeout period.

* * * * *